United States Patent
Bhide et al.

(10) Patent No.: US 11,693,579 B2
(45) Date of Patent: Jul. 4, 2023

(54) VALUE-BASED REPLICATION OF STREAMING DATA

(71) Applicant: International Business Machines Corporation, Armonk, NY (US)

(72) Inventors: Manish Anand Bhide, Hyderabad (IN); Prateek Goyal, Indore (IN); Seema Nagar, Bangalore (IN); Pramod Vadayadiyil Raveendran, Bengaluru (IN); Sougata Mukherjea, New Delhi (IN); Kuntal Dey, Rampurhat (IN)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 17/195,729

(22) Filed: Mar. 9, 2021

(65) Prior Publication Data

US 2022/0291840 A1 Sep. 15, 2022

(51) Int. Cl.
*G06F 3/06* (2006.01)

(52) U.S. Cl.
CPC ............ *G06F 3/065* (2013.01); *G06F 3/0604* (2013.01); *G06F 3/067* (2013.01); *G06F 3/0614* (2013.01); *G06F 3/0659* (2013.01)

(58) Field of Classification Search
CPC ...... G06F 3/065; G06F 3/0604; G06F 3/0614; G06F 3/0659; G06F 3/067
USPC .......................................................... 711/162
See application file for complete search history.

(56) References Cited

U.S. PATENT DOCUMENTS

| | | | |
|---|---|---|---|
| 7,606,924 B2 | 10/2009 | Raz | |
| 8,281,026 B2 | 10/2012 | Lankford | |
| 8,321,688 B2 | 11/2012 | Auradkar | |
| 9,213,652 B1 | 12/2015 | Miao | |
| 9,720,989 B2 | 8/2017 | Theimer | |
| 9,971,529 B1* | 5/2018 | LeCrone | G06F 3/067 |
| 10,243,866 B2* | 3/2019 | Benjamini | H04L 47/623 |
| 2011/0161294 A1 | 6/2011 | Vengerov | |
| 2015/0319207 A1* | 11/2015 | Werr | H04L 67/1095 709/219 |
| 2016/0026640 A1* | 1/2016 | Hart | G06F 16/958 707/751 |
| 2016/0034468 A1* | 2/2016 | Hart | G06Q 30/02 707/751 |
| 2017/0083558 A1 | 3/2017 | Vijayan | |
| 2017/0235645 A1 | 8/2017 | Theimer | |

(Continued)

FOREIGN PATENT DOCUMENTS

CA 2840048 C 9/2015

OTHER PUBLICATIONS

"Stream IoT data to an autonomous database using serverless functions", Dec. 17, 2020, 5 pages, <https://docs.oracle.com/en/solutions/iot-streaming-oci/index.html#GUID-BAE48036-286B-49CE-A6AA-5870CAD689D2>.

(Continued)

*Primary Examiner* — Than Nguyen
(74) *Attorney, Agent, or Firm* — Stephen R. Yoder (57) ABSTRACT

Application-specific prioritization of streaming data replication. Data streamed from connected devices is selectively replicated to data storage clusters based on needs of the applications being served by the data. Data characterization supports prioritized replication processing. Statistical metrics compare streaming data with estimated values to characterize the data for prioritization.

18 Claims, 5 Drawing Sheets

(56) References Cited

U.S. PATENT DOCUMENTS

2018/0260125 A1     9/2018   Botes
2020/0125410 A1     4/2020   Karmarkar

OTHER PUBLICATIONS

Mell et al., "The NIST Definition of Cloud Computing", National Institute of Standards and Technology U.S. Department of Commerce, Special Publication 800-145, Sep. 2011, 7 pages.

Sun et al., "Modeling a Dynamic Data Replication Strategy to Increase System Availability in Cloud Computing Environments", Journal of Computer Science and Technology 27(2): 256{272 Mar. 2012. DOI 10.1007/s11390-012-1221-4, 17 pages.

Tamburini, Diego, "Compute and stream IoT insights with data-driven applications", Posted on Jun. 10, 2019, 7 pages, <https://azure.microsoft.com/en-in/blog/compute-and-stream-iot-insights-with-data-driven-applications/>.

* cited by examiner

VALUE-BASED REPLICATION OF STREAMING DATA

BACKGROUND

The present invention relates generally to the field of data processing, and more particularly to streaming data replication.

The Internet of things (IoT) describes a network of physical objects, referred to as "things," embedded with sensors, software, and/or other technologies for the purpose of connecting and exchanging data with other devices and/or systems over the Internet. Oftentimes networked devices or "things" communicate with applications in a cloud computing environment.

The convergence of multiple technologies such as real-time analytics, machine learning, commodity sensors, and embedded systems have increased the usefulness and adoption of IoT devices. Technological fields such as embedded systems, wireless sensor networks, control systems, and/or automation (including home and building automation) contribute to enabling the Internet of things.

The term "streaming data" as used herein refers to data that is produced continuously such as by sensors and/or IoT devices.

SUMMARY

In one aspect of the present invention, a method, a computer program product, and a system includes: (i) identifying a data record in a data stream, the data record having a first attribute; (ii) determining an attribute value for the first attribute; (iii) for a set of categories, assigning corresponding category levels to the attribute value based on an estimated value; (iv) ranking the category levels by category for a target application, the target application operating to process the data record; and (v) taking a replication action on the data record with respect to the target application based on an overall ranking of the category levels.

Another aspect of the present invention includes: (i) computing a replication value of the data record for the target application by: (a) assigning a first category value to a category level having a first rank; (b) assigning a second category value to a category level having a second rank; and (c) adding the first category value and the second category value. The first category value is lower than the second category value. The overall ranking of the category levels is the replication value.

DETAILED DESCRIPTION

Application-specific prioritization of streaming data replication. Data streamed from connected devices is selectively replicated to data storage clusters based on needs of the applications being served by the data. Data characterization supports prioritized replication processing. Statistical metrics compare streaming data with estimated values to characterize the data for prioritization. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
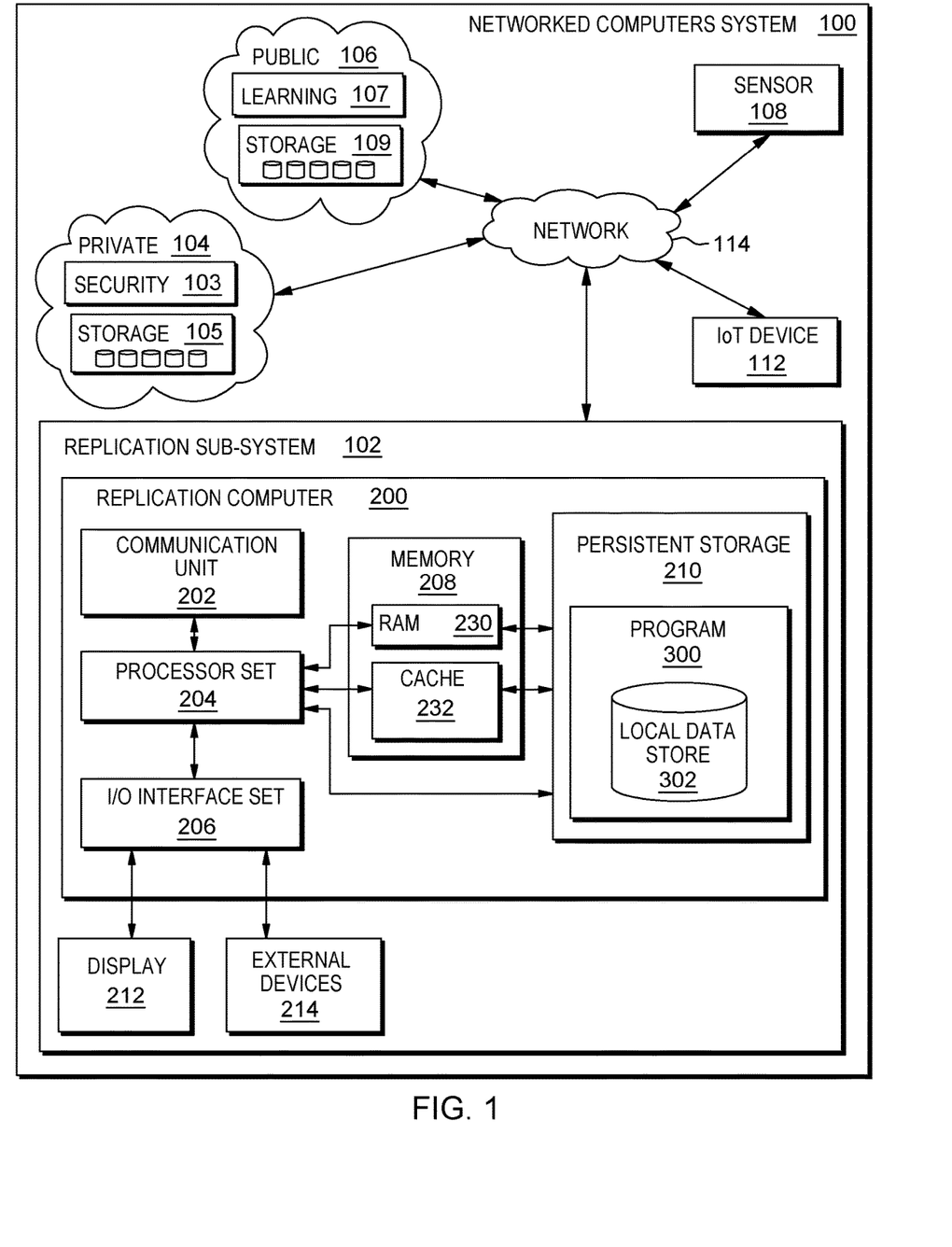
FIG. 1 is a schematic view of a first embodiment of a system according to the present invention.

The present invention will now be described in detail with reference to the Figures. FIG. 1 is a functional block diagram illustrating various portions of networked computers system 100, in accordance with one embodiment of the present invention, including: replication sub-system 102; private cloud environment sub-system 104; security application 103; data storage clusters 105, 109; public cloud environment sub-system 106; machine learning application 107; sensor device sub-system 108; and internet of things (IoT) device sub-system 112; communication network 114; replication computer 200; communication unit 202; processor set 204; input/output (I/O) interface set 206; memory device 208; persistent storage device 210; display device 212; external device set 214; random access memory (RAM) devices 230; cache memory device 232; replication program 300; and local data store 302.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Figure 3:
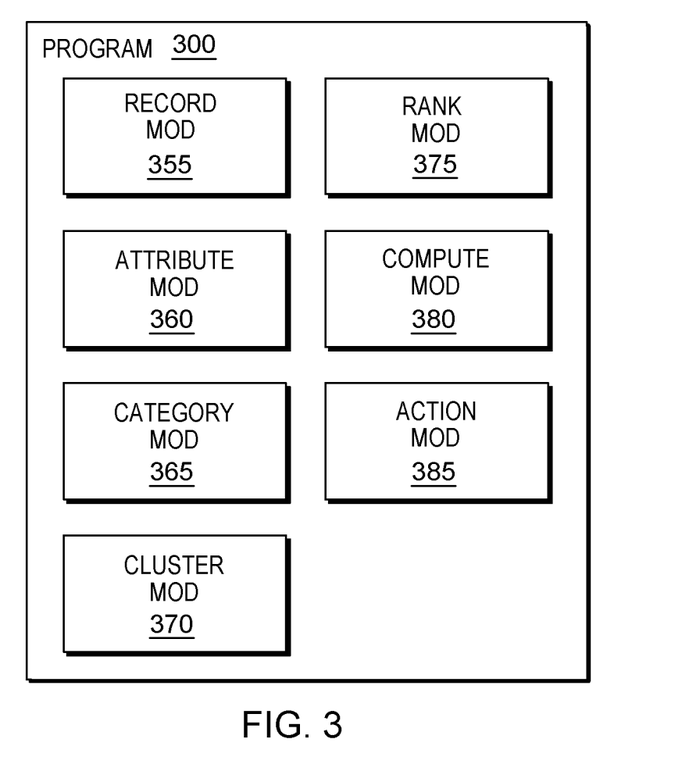
FIG. 3 is a schematic view of a machine logic (for example, software) portion of the first embodiment system.
Figure 4:
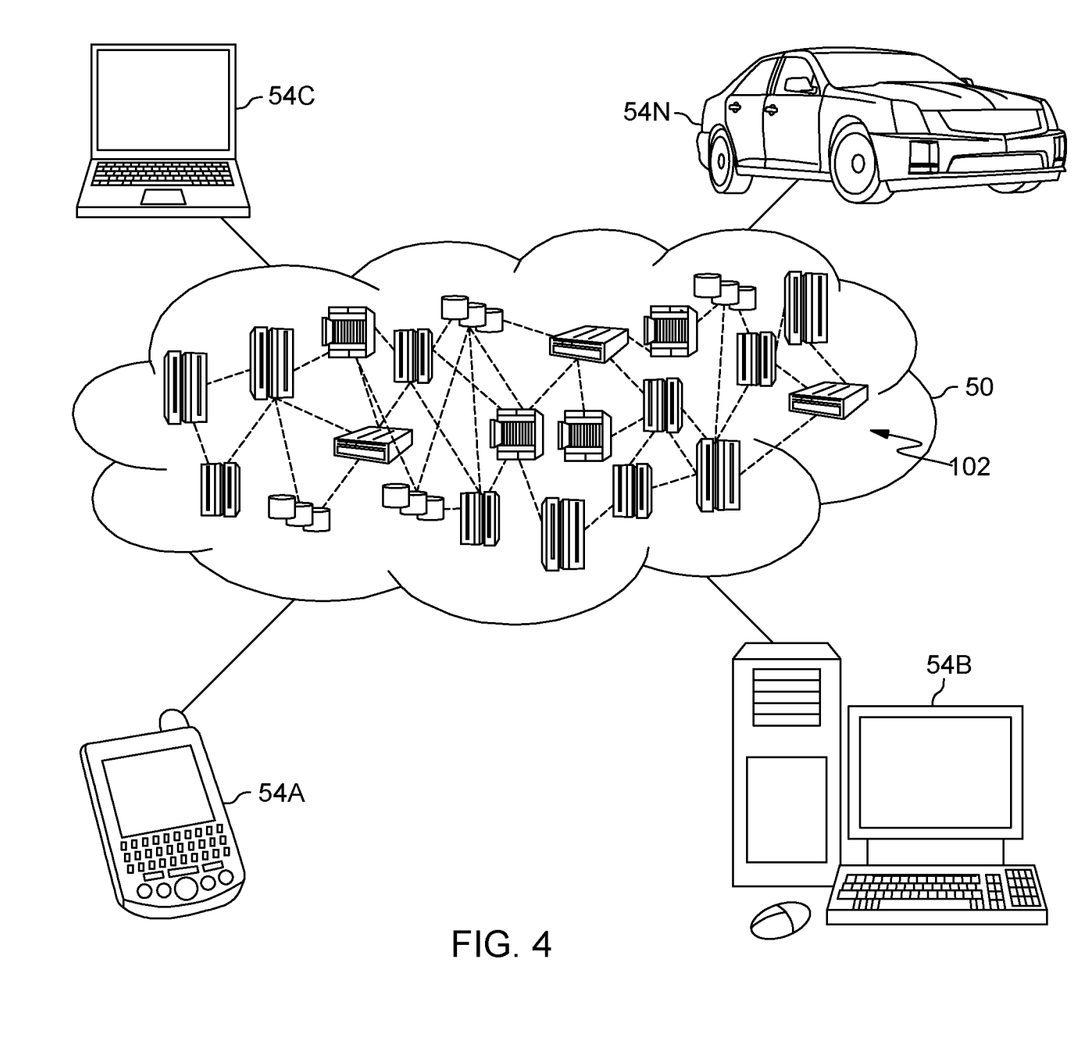
FIG. 4 depicts a cloud computing environment according to an embodiment of the present invention.

Replication program 300 operates to determine, for each data record streaming from monitoring devices, which target applications value the data more than other target applications. For highly valued data, a first target application gains relatively faster access to the data record than other target application placing less value in the data than the first target application. The data record is made available to the first application via a relatively fast replication technique that immediately replicates the data record to the data storage cluster corresponding the first target application. According to some embodiments of the present invention, program 300 (FIG. 3) may be accessed on hardware and software layer 60 (FIG. 4).

Some embodiments of the present invention recognize the following facts, potential problems and/or potential areas for improvement with respect to the current state of the art: (i) data velocity is a very important factor while processing streaming data; (ii) if the streaming data is not processed quickly, it can lose a large share of its value; (iii) oftentimes it is very important for some applications to process and respond to the streaming data in real time; (iv) it is recognized that newly generated records in streaming data from monitoring devices deliver data of differing usefulness to each target application; (v) a newly generated record might be very useful to a first application, while not being as useful to a second application; (vi) determining when to replicate a newly generated record for various applications is an area of concern; (vii) there are no systems and associated methods to enable varied replication technique for newly generated records from streaming data based on importance of the data with respect to various target applications; and/or (viii) practically replicating the large quantity of streaming data in real time for modern IoT devices may delay the decision-making process and may also increase the cost of making decisions.

Examples of continuous data production from sensors or monitoring devices include: (i) sensors on an oil well; (ii) meters monitoring energy use in residential houses; (iii) fitness trackers often worn on the wrists of users; and (iv) toll payment devices in vehicles.

Some embodiments of the present invention are directed to determining whether to replicate a record immediately to data storage clusters across a cloud network when an importance value for replication is higher than a specified threshold.

For example, when streaming data includes financial transactions of a bank and the bank has two applications that use the data. The first application is responsible for detecting critical transactions and the second application is responsible for producing an aggregation of data over a period of time. If transactional data is produced for a savings account and the transaction is of a very high monetary value, the transaction is more relevant for the first application dealing with critical transactions than the second application. Accordingly, the transaction data should be immediately replicated to the data storage cluster used by the first application.

Generally, all streaming data from a monitoring device will be immediately replicated from local data storage to data storage clusters. According to some embodiments of the present invention, the replication technique depends on the replication value each record has with respect to various associated applications. Replication techniques include: (1) immediate replication; (2) lazy replication; and (3) no replication.

Some embodiments of the present invention are directed to a process that includes: finding data characteristics of a newly generated record from a data stream; determining characteristics of relevant applications served by the data stream; assigning an importance value to the newly generated record for each relevant application; and replicating the new record to target storage clusters based on the assigned values for the relevant applications.

Some embodiments of the present invention are directed to dynamically identifying when to replicate each streaming data record to data storage clusters in a cloud environment. Each streaming data record goes through data record characterization to identify the characteristics of the generated record and the value the data record delivers to multiple applications (according to individual application characterizations) residing in separated containers served by these data records. Each newly generated record is replicated to the data storage clusters based on the corresponding value of the data. Records are replicated immediately for the application where the value indication is very high while, for the remaining applications, the replication can be done in a lazy fashion or not at all. According to some embodiments, only the application having the most need of the record benefits from immediate data replication to a corresponding data storage cluster while all other applications must await the replicated data according to a lazy replication technique. Alternatively, each application is queued for replicated data records according to a ranked need for the data to be immediately replicated, thus maintaining freshness of the data for certain applications.

Some embodiments of the present invention are directed to identifying the data record replication value with respect to a target application for determining a replication technique for the data record/application pair.

Some embodiments of the present invention are directed to a process for application-specific streaming data replication that, for a newly generated record, determines data characteristics with respect to pre-defined metrics; identifies each application served by the data stream and a corresponding set of characteristics; with respect to each application, determine the replication value of the data in question, and based on the replication value determine to take a replication action. Replication actions may include: (i) replicate the data in question using an immediate replication technique; (ii) replicate the data in question in a lazy technique; and (iii) do not replicate the data in question. The applications that are the target of the data stream, or data in question, need not be in the same container and in some embodiments of the present invention the various target applications are in separate containers. According to some embodiments of the present invention, a relatively high replication value indicates immediate replication and a relatively low replication value indicates lazy replication such that each application has a threshold replication value above which the replication technique is immediate replication. In that way, the determination to replicate according to a particular replication technique is dependent upon the threshold replication value associated with the application.

Figure 2:
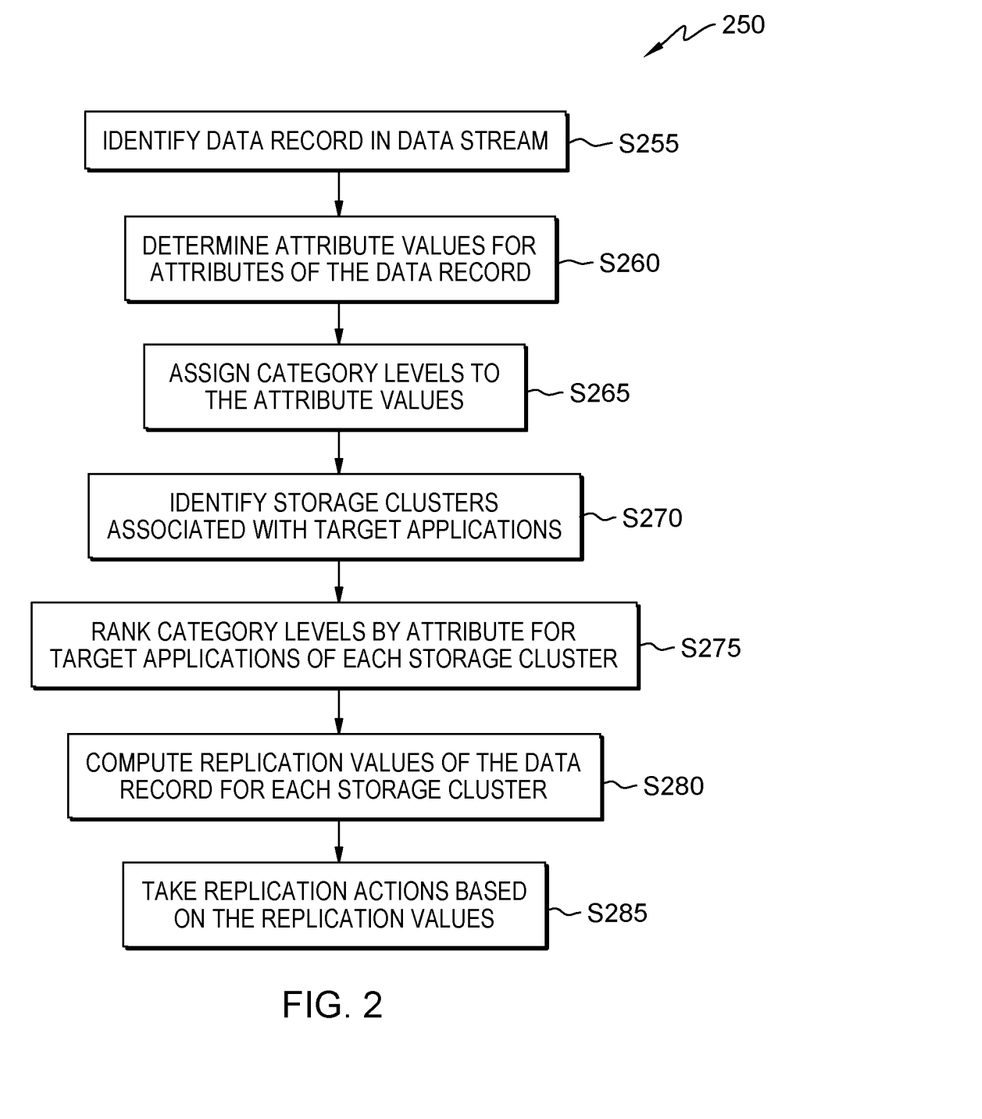
FIG. 2 is a flowchart showing a method performed, at least in part, by the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where record module ("mod") 355 identifies a data record in a data stream. The data record is produced by a device communicating data via a data stream, such as sensor 108 or IoT device 112 (FIG. 1). The data is communicated to known target applications for operational use, or for achieving a particular purpose. Devices discussed herein include sensors and IoT devices but any device capable of transmitting data via a data stream to a plurality of applications may be a data source according to various embodiments of the present invention. The record module identifies the data record in the data stream. In this example, data streamed from sensor 108 passes through network 114 to replication sub-system 102 where the data record is initially stored in local data store 302. Received data is processed by the record module as stated above. Alternatively, record mod 355 operates to intercept data streaming from a streaming device to a set of target applications. In that way, when a record is identified, it is intercepted by the record mod and processed as follows prior to storing the data record to data storage clusters of the target applications. According to some embodiments, the identification of the data record operates to trigger performance of the steps that follow. Alternatively, steps S260 to S270 are performed in advance to identifying the data record.

The target applications for the data record are identified according to mapping architecture of the enterprise for which the data record is generated. Upon identification of a data record, the corresponding target applications are known according to the mapping. In some embodiments of the present invention, when the identified record is produced by a first device, the corresponding target applications are known by virtue of the first device be set up to communication with the target application. Where the streaming device streams data only to applications sharing a single data storage cluster, certain aspects of the present invention are not realized, and certain steps may be unnecessary.

Processing proceeds to step S260, where attribute mod 360 determines attribute values for numeric attributes of the identified data record. The attributes of a data record relate to values in data fields or other characterizing information. Some data records are based on forms that carry fields and or descriptive information. Other data records are a single measurement taken during a monitoring process. Oftentimes data records include both text and numeric information. In this example, the data values of interest are numeric values obtained and streamed from data collection devices such as sensor 108 or IoT device 112 (FIG. 1). Attributes may vary widely depending on what is being monitored and the area of interest in performing the monitoring. For example, temperature may often be measured as an attribute of interest. Other attributes of interest may include: (i) weight, (ii) speed, (iii) quantity, (iv) distance traveled, and/or (v) time or duration of an event or action. For a pre-defined set of attributes, the attribute mod determines the numeric values of the attributes for a given data record. In some embodiments of the present invention, the data record includes a set of attribute values measured over a period of time. For each period of time, a new data record is streamed having measurements taken during the preceding period of time.

Processing proceeds to step S265, where category mod 365 assigns category levels to the attribute values determined in step S260. Category levels are determined in view of an overall estimate value. In this example, the statistical categories of mean, median, and variance are of interest. Other statistical categories that may apply are mode and standard deviation. Statistical categories referenced herein are important concepts of statistics used in data science. Almost all the machine learning algorithms use these concepts or categories in data pre-processing steps. These categories are part of descriptive statistics used to describe and understand data for features in machine learning.

The category levels characterize the current value of an attribute with respect to a degree of similarity to an overall estimated attribute value. Category levels in this example are (i) exact match, (ii) similar, and (iii) dissimilar. For each category such as "mean" there is a category level describing the mean value. In this example, the overall estimate value is based on historic values of the attribute in previously received data records from the same monitoring device, or streaming device. Alternatively, the overall estimate value is based on a desired value for each attribute. According to some embodiments of the present invention, the overall estimate value is the sum of all attributes and corresponding importance of the attributes. The overall value of the record for each application is calculated based on the category level of each measure and the importance of category levels for each attribute measure.

The degree of similarity is a pre-defined value that permits a determination of a category level for each attribute value. Some embodiments of the present invention are directed to maintaining a similarity table listing category levels and their corresponding similarity range required to assign the category level. In some embodiments, a percentage of the overall estimated value directs the similarity determination. In other embodiments, attribute value similarity is expressed as a mathematical difference between the estimated value and the actual value.

Processing proceeds to step S270, where cluster mod 370 identifies storage clusters associated with the target applications of the identified data record. In a cloud computing environment, each target application is located in a container. According to some embodiments of the present invention, each target application is located in a separate container associated with or attached to a separate data storage cluster. The target applications process data stored in the data storage cluster corresponding to the container in which it is located. In this example, the identified data record generated by sensor 109 is targeted to machine learning application 107 associated with data storage cluster 109 and security application 103 associated with data storage cluster 105 (FIG. 1). Data records from streamed data are often stored by default to a local storage device where the data may be processed. Applications that process the streaming data while operating from containers in public, private, and hybrid cloud computing environments draw data records from data storage clusters associated with or attached to their respective containers. Because replicating the large quantity of streaming data from modern IoT devices to multiple applications will lead to a delay in the decision-making process of certain applications which leads to increased cost of making decisions, each target application is identified and a decision is made as to which applications require immediate replication of the streaming data. The cluster mod identifies which data storage clusters may be involved in the immediate replication of data records.

There may be a difference between the count of target applications and the count of data storage clusters for a given data stream and identified data record. Where there are more applications than data storage clusters a grouping of applications by corresponding data storage clusters facilitates replication decisions. For example, when a first application is determined to require immediate replication of the identified data record to a corresponding data storage cluster, there is no need to evaluate the replication requirement of other applications sharing the same data storage cluster.

Processing proceeds to step S275, where rank mod 375, ranks category levels by attribute for target applications associated with or attached to each storage cluster. Each target application uses data for different purposes such that for one application immediately desirable data may involve an attribute having a relatively high ranking first category and a lower ranking second category. In this step, the various categories of attribute values are associated with category levels such that a ranking of category levels is available. For example, for the attribute "distance," an application involving a refueling event may be most impacted by above or below average distance reporting over a period of time suggesting a variation in average fuel consumption. In that case, the statistical category of "mean" and category level of "dissimilar" would be highly ranked and the category level of "exact match" would be the lowest ranked. For other applications, the exact match category level may be the highest ranked level. The rank mod establishes the various rankings for each application with respect to the various attributes of streamed data. Ranking the category levels results in a numeric value for each category and each attribute. For example, a first ranked category level is assigned a rank of 1 and a category value of 3. A second ranked category level is assigned a rank and value of 2.

When ranking the category levels for a set of applications including two applications a decision is made as to which application is the representative application. Alternatively, the decision is made as to ranking the category levels according to a combination of applications in the set of applications. In this example, only one application for each container is identified and the ranking is determined according to the one application.

Processing proceeds to step S280, where compute mod 380 computes replication values of the data record for each storage cluster. Methods of computing the replication value are further discussed in some detail below. The application-specific priority for certain data characteristics drives the replication value for a particular data record. Data characteristics are defined by the values of various numeric attributes compared to a reference estimate value of the numeric attribute. In this example, statistical categories including those for numeric distributions are assigned estimated values for certain attributes. The attribute value for a data record may have statistical categories that are similar to, dissimilar to, or exactly matching the estimated value. The characterizations of similar, dissimilar, or exactly matching are examples of category levels.

In this example, replication values are determined by adding the priority values. An attribute having a first ranked category, a second ranked category, and a second ranked category would have a replication value of five. One for the first rank, two for the second rank, and two for the second rank when added together is five. In this scenario, the lower replication value indicates a higher priority need for data record replication.

As discussed above, the ranking of category levels is dependent upon how the set of applications are analyzed when multiple applications are involved. In this example, a single application is ranked according to the importance of various attributes and corresponding category levels. Alternatively, the ranking of step S275 is based on a first application of multiple target applications in the set of applications.

Processing ends at step S285, where action mod 385 takes a replication action based on the replication value computed in step S280. Replications actions refer to executing various replication techniques such as immediate replication, scheduled replication, no replication, and standby replication. For execution of scheduled replication, the data record is placed on hold for replication until a convenient time in view of resource availability whether historic availability or real-time availability or in view of predefined replication periods. Schedule replication operates to postpone replication by scheduling a time to replicate. The replication technique of standby replication holds replication of the corresponding data record for a next designated replication period based on scheduled resource usage, planned outage, and other scheduled events.

According to some embodiments of the present invention, the application having the lowest replication value has the data record immediately replicated to a corresponding data storage cluster and all other applications having lower replication values are scheduled for later data replication.

Alternatively, each application associated with a replication value below a threshold value have the data record immediately replicated to corresponding data storage clusters. Applications having replication values above the threshold value have the data replication scheduled for a later time.

Where the replication value computed at step S285 does not indicate immediate replication and there is more than one target application associated with or attached to the same data storage cluster, a representative application may be replaced with another application in the same container until an indication of immediate replication is found or no target applications remain to evaluate.

Further embodiments of the present invention are discussed in the paragraphs that follow and later with reference to FIGS. 4-5.

An example process according to some embodiments of the present invention involves a bank that uses transactional data that may be received by sensors and IoT devices among other sources to understand bank activity including: (i) online retail transactions completed by customers; (ii) physical credit card transactions completed by customers; (iii) patterns of customers withdrawing cash from automated teller machines; and (iv) patterns of check issuance by customers. The bank activity is performed for the following purposes: (i) checking credit ratings for customers; (ii) checking program eligibility for customers who have been members for a specified duration, such as 25-30 years; and (iii) checking for improper transactions. The bank uses cloud-based containers, each container dedicated to each individual application using the data generated by the various sensors and IoT devices. The example process proceeds as described below.

A new data record, or new data point, is generated by an IoT device. The replication value of the data of the new record is computed for each of the downstream applications in the various containers. The replication value is computed using the general statistical characteristics of the data point and by running computationally lightweight measurements of potential value to the target applications, such as, comparing certain statistical characteristics of the data point against a give set of key indicators that run in linear operation time locally. For instance, a key indicator checking similarity of a few fields of the data point where customers were members of the organization for a target period of time or checking a few data points such as the total cash withdrawn in a given time period for the purpose of identifying target customers. For example, determining an amount withdrawn for a known type of transaction and comparing the amount withdrawn with an average amount withdrawn generally. According to some embodiments of the present invention, the data point, or data record, is immediately replicated to a data storage cluster for a given application where the replication value indication for the application is the highest among target applications of the data stream from which the data point was identified.

Some embodiments of the present invention are directed to a process including the steps that follow. Characterize the newly generated record. The characterization can potentially include, mean, median, variance, and other statistical descriptions or characteristics of attribute values for each data record. The characterization can further include classification of the data record to a group based on certain attributes. For example, a data record generated by a connected device for a customer having been a member of the organization for 20-30 years may be added to the group or data records "member 20-30 years." For each application residing in separate containers in a cloud environment that a data stream is serving, determine the application characteristics. Determine the replication value of the newly generated record for each application by matching the data characteristics with the characteristics most needed by the application. According to some embodiments of the present invention, a replication value indicates immediate replication for a target application when the replication value is very high relative to the replication values of other target applications. Further, a lazy replication technique is performed for the remaining target applications. Alternatively, the replication values are defined by governing policy such that each target application and data record pair having a replication value above a threshold require the data record to be processed according to an immediate replication technique. Additionally, some embodiments of the present invention apply a second threshold where replication values with respect to target applications below the second threshold are processed according to a less aggressive replication technique than both immediate and lazy replication, but may be processed according to a do-not-replicate technique or a periodic default technique where eventual replication is desired but time does not reduce the value of the data record. An example of a relatively very low replication value for a data record would be where the data record is a one-time transaction type that does not contribute to the historic record managed by the target application.

Some embodiments of the present invention are directed to determining data characteristics of newly generated records from a data stream of a sensor or an IoT device. Some embodiments of the present invention are directed to determining application characteristics. Some embodiments of the present invention are directed to determining a replication value of a newly generated record with respect to each target application. Some embodiments of the present invention are directed to determining when to replicate to storage clusters a newly generated record from a data stream based on an indication of the replication value for target applications served by the data stream.

Newly generated records from a data stream are characterized for replication decisions. Characterization of new records depends on overall estimates for each numeric attribute of pre-defined data metrics and groups of interest with respect to the various attributes. Each numeric attribute is classified into three categories with respect to the statistical descriptions mean, median, and variance: (i) very similar, (ii) similar, and (iii) dissimilar. The category of very similar refers to the attribute value being within epsilon distance from the overall estimate of a statistical description of the attribute value. The category of similar refers to the attribute value being within threshold tau distance from the overall estimate. The category of dissimilar refers to the attribute value being relatively far from the overall estimate. According to some embodiments, the category "very similar" is replaced with the category "exact match." In that way, any attribute value matching the estimate is categorized as an exact match and all other attribute values are determined to be either similar or dissimilar. Some embodiments of the present invention classify the record into the groups of interest based on the value of an attribute. For example, a transaction performed by a new customer having been with the host company less than 2 years would support classification of the record into the group of customer records labeled "less than 2 years."

Application characteristics are determined according to inputs received that may include: (i) application description specified in natural language; (ii) a set of purposes, such as trend, anomaly, and aggregation; and (iii) for a pre-defined set of purposes the corresponding importance for actual attribute value alignment with estimated attribute values. These inputs drive the determination of the best matching purpose of the application and corresponding group classification. Determination of target application characteristics results in a set of groups of interests of the target application and a ranking of category levels for each metric. For the given set of purposes, determine corresponding embedding representations using existing methods. Embedding for an application is determined according to the natural language description. The similarity of the application embedding vector is determined based on the purposes embedding vectors. Identify the highest similarity purpose of the application. For the purpose, determine the actual attribute value alignment with estimated attribute values for each attribute of interest to the application. Essentially, this determination focuses on whether the purpose of the application gives more importance to very similar, similar, or dissimilar records from the streaming data. Additionally, parsing the natural language description may be necessary to identify a particular group mentioned in the description. If a particular group is mentions, the group should be added to the set of groups.

Some embodiments of the present invention are directed to determining the replication value of a data record taken from a data stream with respect to a set of target applications. For each target application, the corresponding importance for actual attribute value alignment with estimated attribute values are obtained. Groups of interest associated with the record and the characteristics of the records are also considered when establishing the replication value. For each target application a corresponding replication value is assigned to the data record in question. Based on the actual attribute value alignment and the importance of the alignment of each actual attribute value for each relevant attribute, compute the replication value of the record with respect to each target application.

The replication value of streaming data, $data_1$, for a target application, $app_a$ for attribute x with three categories each having a computed numeric category value can be computed in following manner:

$$\text{Replication Value } (data_1, app_a) = \sum_{category=i}^{3} X_i$$

According to some embodiments of the present invention, an individual category value of 3 represents an alignment of the actual value that is the most important alignment required by the application, a category value of 2 represents an alignment of the actual value that is the second most important alignment required by the application, and a category value of 1 represents an alignment of the actual value that is the least important alignment required by the application. Accordingly, an target application may assign a highest replication score available, 6, where each of three categories for a given attribute are aligned with the most important alignment required by the target application. When considering two attributes with three categories each, the maximum replication value would be 12 according to the scenario discussed above.

An example use case follows for a first record from a data stream having a first attribute. The mean historic value of the first attribute is very similar to the actual value for the record while the variance falls into dissimilar category level with respect to historic values for variance.

For a first application, the order of importance of the mean category levels is first "dissimilar," second "similar," and third "very similar." For the first application, the order of importance of the variance category level is first "dissimilar," second "similar," and third "very similar." Then the replication value of the first record with respect to the first application for just the first attribute is as follows:

Replication value($record_1$,$application_1$)=(mean)1+ (variance)3=4;

where the application sets a "very similar" mean in a record to a value of 1 and a "dissimilar" variance in a record to a value of 3.

The replication value with respect to other attributes may also be computed in a similar manner with each of the category values for each attribute are added together to determine the replication value of the record/application pair. The overall replication value of the first record with respect to the second application is the sum of category level values across all the attributes of the first record with respect to the second application. Additionally, if the target application has group(s) of interests associated with it and the record falls into the same group(s), then the value of record to the target application is further increased by multiplying the replication value with a factor K.

Some embodiments of the present invention are directed to a process for timing the replication of records from streaming data at data storage clusters accessible over a cloud network. Inputs supporting the timing of replication may include: (i) record data; (ii) replication value of the record with respect to each target application; and (iii) data storage cluster information associated with each target application. The timing for replication at a data storage cluster is based on the replication value of the record for the target application associated with the data storage cluster. In some embodiments of the present invention a data replication schedule is generated for replication of the record for the various target applications associated with the record.

An example process for timing the replication of records involves the steps that follow. Classify the value indication for each application to very high, high, medium, and low. For the target applications where the value indication falls into the very high category, replicate immediately to the corresponding data storage clusters. For the target applications where the value indication is high, replication is performed during a next available replication cycle of the corresponding data storage clusters. For the target applications where the value indication is medium, replication is performed in the next few hours or days according to a governing policy for medium priority replication. Alternatively, when the next available replication cycle of a corresponding data storage cluster is earlier than would be required by the governing policy for medium priority replication, replication is scheduled for the next available replication cycle. Alternatively, the governing policy includes rules related to timing of replication in view of earlier available standard replication cycle of the corresponding data storage cluster.

For the target application where the value indication is low, replication may not be performed at all. Some embodiments of the present invention rely on governing policy for replication of low priority replication. In the case of a low value indication, or as low priority replication rule, to avoid the starvation of the application with respect to the record because the replication process may not be performed at all, some embodiments of the present invention give a TTL (time to live) of the value indication of the record after which the record would automatically be promoted to a medium value indication, or medium priority rule, so that the record is eventually replicated at the data storage cluster to avoid data starvation.

According to some embodiments of the present invention, strategic replication of streaming data based on application-specific need for the streaming data is performed with reference to replication priority values linking the data characteristics to the usefulness of the data to various target applications identified via enterprise mapping information.

Some embodiments of the present invention are directed to a step of dynamically identifying when to replicate each streaming data record to data storage clusters in a cloud environment.

Some embodiments of the present invention are directed to a step wherein each streaming data record goes through data record characterization to identify the characteristics of the generated record and the value the data brings to individual target applications (using an application characterization process) residing in separated containers served by the data record.

Some embodiments of the present invention are directed to a step wherein each newly generated record in a data stream is replicated to the data storage clusters based on a computed replication value wherein the record is replicated immediately for an application where the value indication is very high while for the other applications with a lower value indication, the replication is performed in a lazy replication technique.

Some embodiments of the present invention may include one, or more, of the following features, characteristics and/or advantages: (i) enables data replication on streaming data with reference to historic usage to deduce the frequency of access as the data is generated in real time; (ii) real-time decision making for replication of streaming data records; and/or (iii) dynamically identifies when to replicate each streaming data record to data storage clusters in hybrid multi cloud environment depending on the value the data brings to multiple applications.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes, such as replication sub-system 102, with which local computing devices used by cloud consumers, such as, for example, personal digital assistant (PDA) or cellular telephone 54A, desktop computer 54B, laptop computer 54C, and/or automobile computer system 54N may communicate. The nodes may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that the computing nodes and cloud computing environment 50 can communicate with any type of computerized device over any type of network and/or network addressable connection (e.g., using a web browser).

Figure 5:
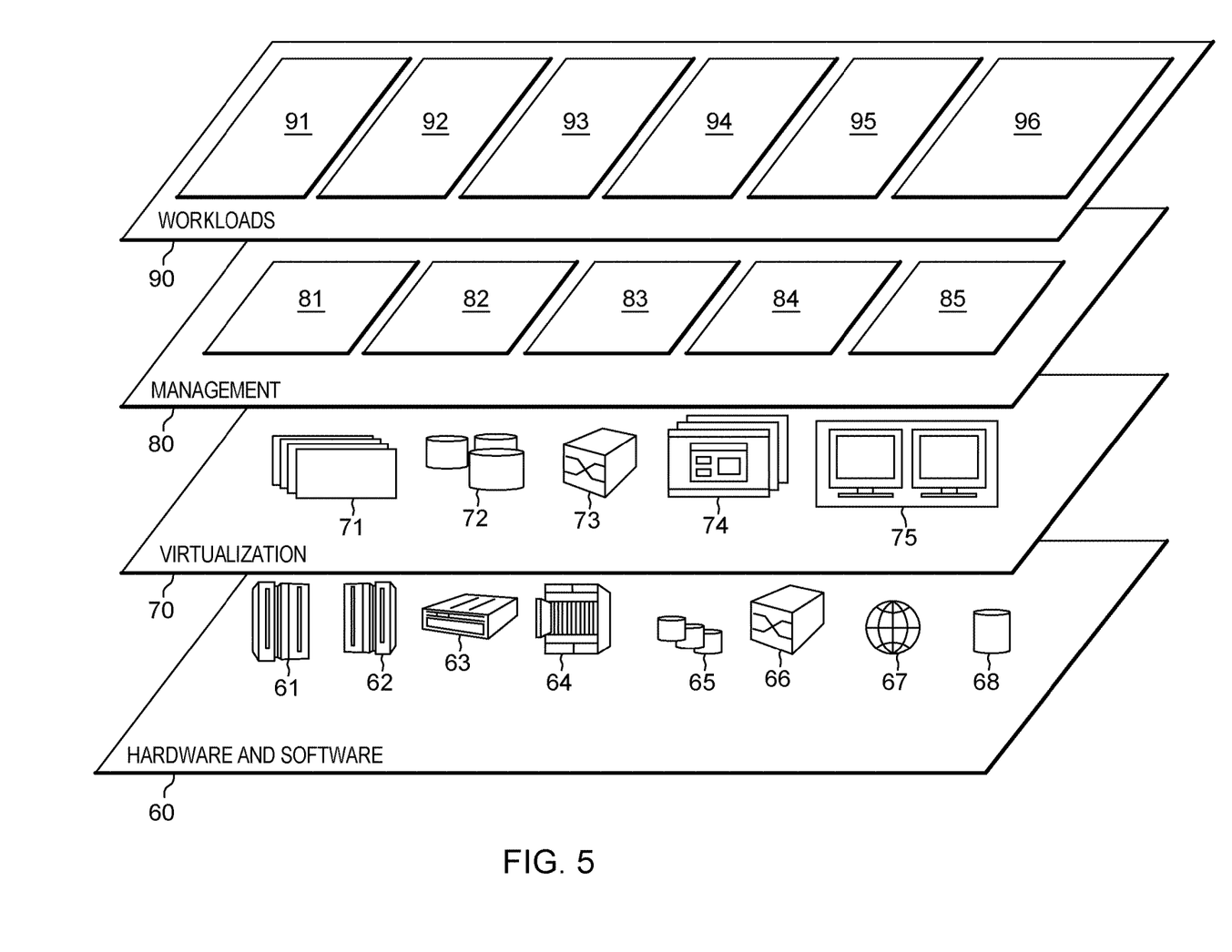
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application-specific record replication processing 96.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
   identifying a data record in a data stream, the data record having a first attribute;
   determining an attribute value for the first attribute;
   for a set of categories, assigning corresponding category levels to the attribute value based on an estimated value;
   ranking the category levels by category for a target application, the target application operating to process the data record; and
   taking a replication action on the data record with respect to the target application based on an overall ranking of the category levels.

2. The method of claim 1, wherein the data stream is generated by a connected IoT device monitoring transaction data.

3. The method of claim 1, further comprising:
determining the estimated value with reference to historical record values of the attribute for previous data records in the data stream.

4. The method of claim 1, wherein:
the category levels are defined based on three categories, mean, median, and variance; and
each category level is one of: similar, dissimilar, and exact match.

5. The method of claim 1, further comprising:
computing a replication value of the data record for the target application by:
assigning a first category value to a category level having a first rank;
assigning a second category value to a category level having a second rank; and
adding the first category value and the second category value;
wherein:
the first category value is lower than the second category value; and
the overall ranking of the category levels is the replication value.

6. The method of claim 1, further comprising:
assigning the data record to a first group based on a second attribute; and
increasing the overall ranking of the category levels by a pre-defined factor when the first group is a group of interest to the target application.

7. A computer program product comprising a computer-readable storage medium having a set of instructions stored therein which, when executed by a processor, causes the processor to perform a method comprising:
identifying a data record in a data stream, the data record having a first attribute;
determining an attribute value for the first attribute;
for a set of categories, assigning corresponding category levels to the attribute value based on an estimated value;
ranking the category levels by category for a target application, the target application operating to process the data record; and
taking a replication action on the data record with respect to the target application based on an overall ranking of the category levels.

8. The computer program product of claim 7, wherein the data stream is generated by a connected IoT device monitoring transaction data.

9. The computer program product of claim 7, further causing the processor to perform a method comprising:
determining the estimated value with reference to historical record values of the attribute for previous data records in the data stream.

10. The computer program product of claim 7, wherein:
the category levels are defined based on three categories, mean, median, and variance; and
each category level is one of: similar, dissimilar, and exact match.

11. The computer program product of claim 7, further causing the processor to perform a method comprising:
computing a replication value of the data record for the target application by:
assigning a first category value to a category level having a first rank;
assigning a second category value to a category level having a second rank; and
adding the first category value and the second category value;
wherein:
the first category value is lower than the second category value; and
the overall ranking of the category levels is the replication value.

12. The computer program product of claim 7, further causing the processor to perform a method comprising:
assigning the data record to a first group based on a second attribute; and
increasing the overall ranking of the category levels by a pre-defined factor when the first group is a group of interest to the target application.

13. A computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to perform a method comprising:
identifying a data record in a data stream, the data record having a first attribute;
determining an attribute value for the first attribute;
for a set of categories, assigning corresponding category levels to the attribute value based on an estimated value;
ranking the category levels by category for a target application, the target application operating to process the data record; and
taking a replication action on the data record with respect to the target application based on an overall ranking of the category levels.

14. The computer system of claim 13, wherein the data stream is generated by a connected IoT device monitoring transaction data.

15. The computer system of claim 13, further causing the processor to perform a method comprising:
determining the estimated value with reference to historical record values of the attribute for previous data records in the data stream.

16. The computer system of claim 13, wherein:
the category levels are defined based on three categories, mean, median, and variance; and
each category level is one of: similar, dissimilar, and exact match.

17. The computer system of claim 13, further causing the processor to perform a method comprising:
computing a replication value of the data record for the target application by:
assigning a first category value to a category level having a first rank;
assigning a second category value to a category level having a second rank; and
adding the first category value and the second category value;
wherein:
the first category value is lower than the second category value; and
the overall ranking of the category levels is the replication value.

18. The computer system of claim 13, further causing the processor to perform a method comprising:
   assigning the data record to a first group based on a second attribute; and
   increasing the overall ranking of the category levels by a pre-defined factor when the first group is a group of interest to the target application.

\* \* \* \* \*